US010616380B2

(12) United States Patent
Anand et al.

(10) Patent No.: US 10,616,380 B2
(45) Date of Patent: Apr. 7, 2020

(54) METHOD OF HANDLING LARGE PROTOCOL LAYERS FOR CONFIGURABLE EXTRACTION OF LAYER INFORMATION AND AN APPARATUS THEREOF

(71) Applicant: CAVIUM, INC., San Jose, CA (US)

(72) Inventors: Vishal Anand, Saratoga, CA (US); Tsahi Daniel, Palo Alto, CA (US); Premshanth Theivendran, Foster City, CA (US)

(73) Assignee: Cavium, LLC, Santa Clara, CA (US)

( * ) Notice: Subject to any disclaimer, the term of this patent is extended or adjusted under 35 U.S.C. 154(b) by 0 days.

(21) Appl. No.: 14/309,763

(22) Filed: Jun. 19, 2014

(65) Prior Publication Data
US 2015/0373165 A1 Dec. 24, 2015

(51) Int. Cl.
H04L 29/06 (2006.01)
H04L 29/08 (2006.01)

(52) U.S. Cl.
CPC ............ H04L 69/22 (2013.01); H04L 69/321 (2013.01)

(58) Field of Classification Search
CPC ..... H04L 69/22; H04L 45/24; H04L 45/7453; H04L 49/3072
See application file for complete search history.

(56) References Cited

U.S. PATENT DOCUMENTS

| 5,781,729 A | 7/1998 | Baker et al. |
| 5,805,808 A | 9/1998 | Hasani et al. |
| 5,951,651 A | 9/1999 | Lakshman |
| 6,088,356 A | 7/2000 | Hendel et al. |
| 6,341,129 B1* | 1/2002 | Schroeder ............... H04L 47/10 370/354 |
| 6,356,951 B1* | 3/2002 | Gentry, Jr. ............... H04L 69/22 709/217 |
| 6,606,301 B1 | 8/2003 | Muller et al. |
| 6,789,116 B1 | 9/2004 | Sarkissian et al. |
| 6,831,917 B1 | 12/2004 | Cheriton |
| 6,952,425 B1 | 10/2005 | Nelson |
| 7,017,162 B2 | 3/2006 | Smith |
| 7,187,694 B1* | 3/2007 | Liao ....................... H04L 69/12 370/474 |

(Continued)

FOREIGN PATENT DOCUMENTS

| CN | 101095310 A | 12/2007 |
| CN | 101543018 A | 9/2009 |

(Continued)

OTHER PUBLICATIONS

Office Action for the Japanese Application No. 2015122559 dated Mar. 18, 2019.

(Continued)

Primary Examiner — Rina C Pancholi

(57) ABSTRACT

Embodiments of the apparatus for handling large protocol layers relate to an implementation that optimizes a field selection circuit. This implementation provides software like flexibility to a hardware parser engine in parsing packets. The implementation limits a size of each layer and splits any layer that exceeds that size into smaller layers. The parser engine extracts data from the split layers just as it would from a non-split layer and, then, concatenates the extracted data in a final result.

28 Claims, 3 Drawing Sheets

(56) References Cited

U.S. PATENT DOCUMENTS

| | | | |
|---|---|---|---|
| 7,293,113 B1* | 11/2007 | Krishna | H04L 69/16 |
| | | | 709/250 |
| 7,359,403 B1* | 4/2008 | Rinne | H04W 28/065 |
| | | | 370/392 |
| 7,367,052 B1 | 4/2008 | Desanti | |
| 7,391,735 B2 | 6/2008 | Johnson | |
| 7,502,374 B1 | 3/2009 | Parker et al. | |
| 7,568,047 B1* | 7/2009 | Aysan | H04L 45/02 |
| | | | 370/352 |
| 7,606,263 B1 | 10/2009 | Parker | |
| 7,710,959 B2 | 5/2010 | Ramasamy et al. | |
| 7,715,611 B2 | 5/2010 | Eaton et al. | |
| 7,802,009 B2 | 9/2010 | Cui et al. | |
| 7,822,032 B1 | 10/2010 | Parker et al. | |
| 7,903,689 B2 | 3/2011 | Niinomi et al. | |
| 8,031,640 B2 | 10/2011 | Mitsumori | |
| 8,054,744 B1 | 11/2011 | Bishara et al. | |
| 8,112,800 B1 | 2/2012 | Yang et al. | |
| 8,144,706 B1 | 3/2012 | Daniel et al. | |
| 8,570,713 B2 | 10/2013 | Kumfer | |
| 8,576,173 B2 | 11/2013 | Verhaegh | |
| 8,705,533 B1 | 4/2014 | Venkatraman | |
| 8,804,733 B1 | 8/2014 | Safrai | |
| 9,064,058 B2 | 6/2015 | Daniel | |
| 9,313,115 B2 | 4/2016 | Kamerkar et al. | |
| 9,525,647 B2 | 12/2016 | Koponen | |
| 9,590,820 B1 | 3/2017 | Shukla | |
| 9,590,914 B2 | 3/2017 | Alizadeh Attar et al. | |
| 9,742,694 B2 | 8/2017 | Anand | |
| 2001/0050914 A1 | 12/2001 | Akahane et al. | |
| 2002/0009076 A1 | 1/2002 | Engbersen | |
| 2002/0016852 A1 | 2/2002 | Nishihara | |
| 2002/0062394 A1 | 5/2002 | Bunn et al. | |
| 2002/0076142 A1 | 6/2002 | Song | |
| 2002/0083210 A1 | 6/2002 | Harrison et al. | |
| 2002/0101867 A1 | 8/2002 | O'Callaghan et al. | |
| 2002/0163935 A1 | 11/2002 | Paatela | |
| 2002/0191521 A1 | 12/2002 | Minamino et al. | |
| 2003/0037154 A1 | 2/2003 | Poggio et al. | |
| 2003/0144993 A1 | 7/2003 | Kishigami | |
| 2003/0152078 A1 | 8/2003 | Henderson et al. | |
| 2003/0193949 A1 | 10/2003 | Kojima et al. | |
| 2003/0198216 A1 | 10/2003 | Lewis | |
| 2003/0210702 A1 | 11/2003 | Kendall | |
| 2003/0218978 A1 | 11/2003 | Brown | |
| 2003/0231625 A1 | 12/2003 | Calvignac et al. | |
| 2004/0019733 A1 | 1/2004 | Garinger | |
| 2004/0064589 A1 | 4/2004 | Boucher et al. | |
| 2005/0076228 A1 | 4/2005 | Davis | |
| 2005/0213570 A1 | 9/2005 | Stacy et al. | |
| 2005/0220107 A1 | 10/2005 | Del Regno | |
| 2005/0232303 A1 | 10/2005 | Deforche et al. | |
| 2005/0246716 A1 | 11/2005 | Smith | |
| 2005/0276230 A1 | 12/2005 | Akahane et al. | |
| 2005/0281281 A1 | 12/2005 | Nair et al. | |
| 2006/0039372 A1* | 2/2006 | Sarkinen | H04Q 11/04 |
| | | | 370/389 |
| 2006/0168309 A1 | 7/2006 | Sikdar et al. | |
| 2006/0215653 A1 | 9/2006 | LaVigne | |
| 2006/0215695 A1 | 9/2006 | Olderdissen | |
| 2006/0259620 A1 | 11/2006 | Tamai | |
| 2006/0280178 A1* | 12/2006 | Miller | H04L 69/22 |
| | | | 370/389 |
| 2007/0078997 A1 | 4/2007 | Stern | |
| 2007/0268931 A1 | 11/2007 | Shaikli | |
| 2008/0008159 A1 | 1/2008 | Bourlas et al. | |
| 2009/0067325 A1* | 3/2009 | Baratakke | H04L 69/16 |
| | | | 370/229 |
| 2009/0067446 A1 | 3/2009 | Lee | |
| 2009/0234818 A1 | 9/2009 | Lobo et al. | |
| 2009/0238190 A1 | 9/2009 | Cadigan, Jr. et al. | |
| 2010/0161787 A1 | 6/2010 | Jones | |
| 2010/0272125 A1 | 10/2010 | Franke et al. | |
| 2010/0329255 A1 | 12/2010 | Singhal | |
| 2011/0022732 A1 | 1/2011 | Hutchison et al. | |
| 2011/0040923 A1 | 2/2011 | Ren | |
| 2011/0058514 A1 | 3/2011 | Lee et al. | |
| 2011/0134920 A1 | 6/2011 | Dyke | |
| 2011/0142070 A1 | 6/2011 | Lim et al. | |
| 2011/0261698 A1 | 10/2011 | Kamerkar et al. | |
| 2011/0261812 A1 | 10/2011 | Kini et al. | |
| 2011/0268123 A1 | 11/2011 | Kopelman et al. | |
| 2011/0310892 A1 | 12/2011 | DiMambro | |
| 2012/0159132 A1* | 6/2012 | Abel | G06F 9/3885 |
| | | | 712/229 |
| 2012/0281714 A1 | 11/2012 | Chang et al. | |
| 2013/0039278 A1 | 2/2013 | Bouazizi | |
| 2013/0163427 A1 | 6/2013 | Beliveau et al. | |
| 2013/0163475 A1 | 6/2013 | Beliveau et al. | |
| 2013/0195457 A1 | 8/2013 | Levy et al. | |
| 2013/0215906 A1 | 8/2013 | Hidai | |
| 2013/0238792 A1 | 9/2013 | Kind et al. | |
| 2014/0078902 A1 | 3/2014 | Edsall et al. | |
| 2014/0119231 A1 | 5/2014 | Chan et al. | |
| 2014/0153443 A1 | 6/2014 | Carter | |
| 2014/0269307 A1 | 9/2014 | Banerjee et al. | |
| 2014/0328354 A1 | 11/2014 | Michael | |
| 2014/0369365 A1 | 12/2014 | Denio et al. | |
| 2015/0081726 A1* | 3/2015 | Izenberg | H04L 47/2433 |
| | | | 707/755 |
| 2015/0189047 A1 | 7/2015 | Naaman et al. | |
| 2015/0222533 A1 | 8/2015 | Birrittella et al. | |
| 2015/0277911 A1 | 10/2015 | Khartikov et al. | |
| 2016/0274944 A1 | 9/2016 | Winkel | |
| 2017/0048144 A1 | 2/2017 | Liu | |

FOREIGN PATENT DOCUMENTS

| | | |
|---|---|---|
| CN | 101563908 A | 10/2009 |
| CN | 101694627 A | 4/2010 |
| CN | 101777791 A | 7/2010 |
| CN | 102104541 A | 6/2011 |
| CN | 102204180 A | 9/2011 |
| CN | 102273149 A | 12/2011 |
| CN | 102656850 A | 9/2012 |
| CN | 103444138 A | 2/2013 |
| CN | 103597794 A | 2/2014 |
| EP | 1735957 A2 | 12/2006 |
| JP | 2000196672 A | 7/2000 |
| JP | 2000253061 A | 9/2000 |
| JP | 2003308206 A | 10/2003 |
| JP | 2005522948 A | 7/2005 |
| JP | 2007503770 A | 2/2007 |
| JP | 2007166514 A | 6/2007 |
| JP | 2009260880 A | 11/2009 |
| JP | 2009272912 A | 11/2009 |
| JP | 2013055642 A | 3/2013 |
| JP | 2014510504 A | 4/2014 |
| WO | 2005036834 A1 | 4/2005 |
| WO | 2011078108 A1 | 6/2011 |
| WO | 2012138370 A1 | 10/2012 |

OTHER PUBLICATIONS

Office Action for the Japanese Application No. 2015122561 dated Mar. 18, 2019.

Office Action for the Japanese Application No. 2015-122562 dated Mar. 18, 2019.

The Office Action and English Translation for the Taiwanese application No. 104111755.

The Office Action and English Translation for the Taiwanese application No. 104110829.

The Japanese Office Action dated Mar. 18, 2019, for Japanese Patent Application No. 2015-122560.

Office Action for the Japanese Application No. 2015122564 dated Mar. 25, 2019.

The Office Action dated Aug. 19, 2019 for Chinese Patent Application No. 201502297799.

The Office Action dated Aug. 26, 2019 for Japanese Patent Application No. 2015122562.

(56) References Cited

OTHER PUBLICATIONS

The Office Action dated Aug. 27, 2019 for Chinese Patent Application No. 201502724360.
The Office Action dated Aug. 27, 2019 for Chinese Patent Application No. 20150229610.3.
The Office Action dated Sep. 3, 2019 for Chinese Patent Application No. 2015102726703.
The Office Action dated Jul. 17, 2019 for Chinese Patent Application No. 201510276426.4.
The Office Action dated Jul. 17, 2019 for Chinese Patent Application No. 201510276588.8.
The Office Action dated Jul. 29, 2019 for Chinese Patent Application No. 2015102724093.
The Office Action dated Aug. 2, 2019 for Chinese Patent Application No. 2015102369392.
The Office Action dated Aug. 5, 2019 for Chinese Patent Application No. 201510272163X.
The Office Action from the Chinese Patent Application No. 201510229770.8 dated Aug. 5, 2019.

* cited by examiner

METHOD OF HANDLING LARGE PROTOCOL LAYERS FOR CONFIGURABLE EXTRACTION OF LAYER INFORMATION AND AN APPARATUS THEREOF

FIELD OF INVENTION

The present invention relates to network packets. More particularly, the present invention relates to a method of handling large protocol layers for configurable extraction of layer information and an apparatus thereof.

BACKGROUND OF THE INVENTION

A network packet includes multiple traffic or protocol layers, where each layer is independent of other layers. While traditional hardware implementations provide parsing abilities, the traditional hardware implementations are inflexible and resource inefficient. A limitation of such inflexibility and inefficiency is the maximum length of the individual layers. This limitation is dictated by a field selection circuit that must be built in hardware. The logic that goes into the hardware is directly proportional to the maximum layer length. For example, to extract "T" total bytes in a programmable way from a layer, where the layer can be of size "L" bytes, the total number of byte MUXes required for that layer is T*(L:1) MUXes. Thus, the bigger "L" is, the bigger the size of the field selection circuit is, which increases hardware costs. If a parser engine is able to handle multiple layers in a packet, then the overall MUX structure cost is the size of the field selection circuit multiplied by the number of layers the parser engine supports.

BRIEF SUMMARY OF THE INVENTION

Embodiments of the apparatus for handling large protocol layers relate to an implementation that optimizes a field selection circuit. This implementation provides software like flexibility to a hardware parser engine in parsing packets. The implementation limits a size of each layer and splits any layer that exceeds that size into smaller layers. The parser engine extracts data from the split layers just as it would from a non-split layer and, then, concatenates the extracted data in a final result.

In one aspect, a method of implementing a parser engine is provided. The method includes splitting layers of a packet based on protocol layers such that each of the protocol layers of the packet is separated. In some embodiments, splitting layers of a packet includes storing layer type of each protocol layer of the packet in a first array and storing an offset of where each protocol layer of the packet ends is stored in a second array.

The method includes further splitting each of the protocol layers of the packet that has a size greater than a predetermined size into a plurality of layers. The first array and the second array are updated based on the further split. In some embodiments, the predetermined size is software defined.

The method includes processing all of the split layers. In some embodiments, processing all split layers include generalizing each of the split layers to a generic format and selecting contents from each of the generalized split layers. In some embodiments, selecting contents from each of the generalized split layers includes applying at least one from a set of generic commands to the generalized split layer to thereby extract a field from the generalized split layer. In some embodiments, each within the set of generic commands is agnostic of specific fields within protocol layers.

In some embodiments, the method includes concatenating results from the processing are concatenated to form a token, wherein the token is used for further processing of the packet.

In some embodiments, the method includes applying a bit vector to results from the processing to form an input to a hash function, wherein an output of the hash function is a unique signature that identifies which of equal-cost multi-path routes the packet should take.

In another aspect, a method of implementing a parser engine is provided. The method includes splitting layers of a packet based on protocol layers such that each of the protocol layers of the packet is separated.

The method also includes maintaining information regarding a layer type of each of the protocol layers and an offset of where each of the protocol layers ends. In some embodiments, the information regarding the layer type is stored in a first array, and the information regarding the offsets is stored in a second array.

The method also includes further splitting any of the protocol layers of the packet that has a size greater than a predetermined size into a first part and a second part, wherein the first part is of the predetermined size. The predetermined size is software defined.

The method also includes updating the information based on the further split. In some embodiments, updating the information includes storing information regarding layer types of the first part and the second part in sequential elements of the first array, and storing information regarding offsets of the first part and the second part in sequential elements of the second array.

The method also includes, based on a determination that the second part has a size greater than the predetermine size, repeating the further splitting step and the updating step with the second part.

The method also includes processing all of the split layers. In some embodiments, prior to processing, generalizing each of the split layers to a generic format. In some embodiments, processing the split layers includes extracting data from the generalized layers.

In yet another aspect, a method of implementing a network switch is provided. The method includes parsing a packet based on protocol layers, thereby initializing a first array and a second array. In some embodiments, parsing a packet includes identifying a layer type of each layer in the packet, storing the layer type of each layer in the first array, identifying an offset of where each layer ends in the packet is, and storing the offset of where each layer ends in the second array. In some embodiments, the method includes storing the first array and the second array in the memory of the network switch.

The method also includes comparing each element of the first array with a programmable register to determine whether a layer associated with the element needs to be split. In some embodiments, the programmable register includes a layerType field, which indicates which a corresponding entry matches, a splitLength field, which indicates an offset at which a corresponding layer should be split at, and a newLayerType field, which indicates a layer type value of the new split layer. In some embodiments, prior to parsing a packet, the method includes programming the layerType field, the splitLength field and the newLayerType field via software.

The method also includes, based on the determination that the layer associated with the element needs to be split, splitting the layer.

The method also includes updating the first array and the second array according to the split, and extracting data from a layer associated with each element of the first array.

In some embodiments, the method includes joining the extracted data to thereby form a final result. In some embodiments, applying a bit vector to results from logical AND operations, wherein each of the logical AND operations is applied on a bit mask and the extracted data from a layer.

In yet another aspect, a parser engine is provided. The parser engine includes a circuit configured to split layers of a packet based on protocol layers such that each of the protocol layers of the packet is separated, further split each of the protocol layers of the packet that has a size greater than a predetermined size into a plurality of layers, and process all of the split layers.

In some embodiments, information regarding a layer type of each of the protocol layers and an offset of where each of the protocol layers ends is maintained. The information is updated after further splitting each of the protocol layers of the packet that has a size greater than a predetermined size into a plurality of layers.

In some embodiments, the circuit is also configured to concatenate results from the processing to form a token, wherein the token is used for further processing of the packet.

In some embodiments, the circuit is also configured to apply a bit vector to results from the processing to form an input to a hash function.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
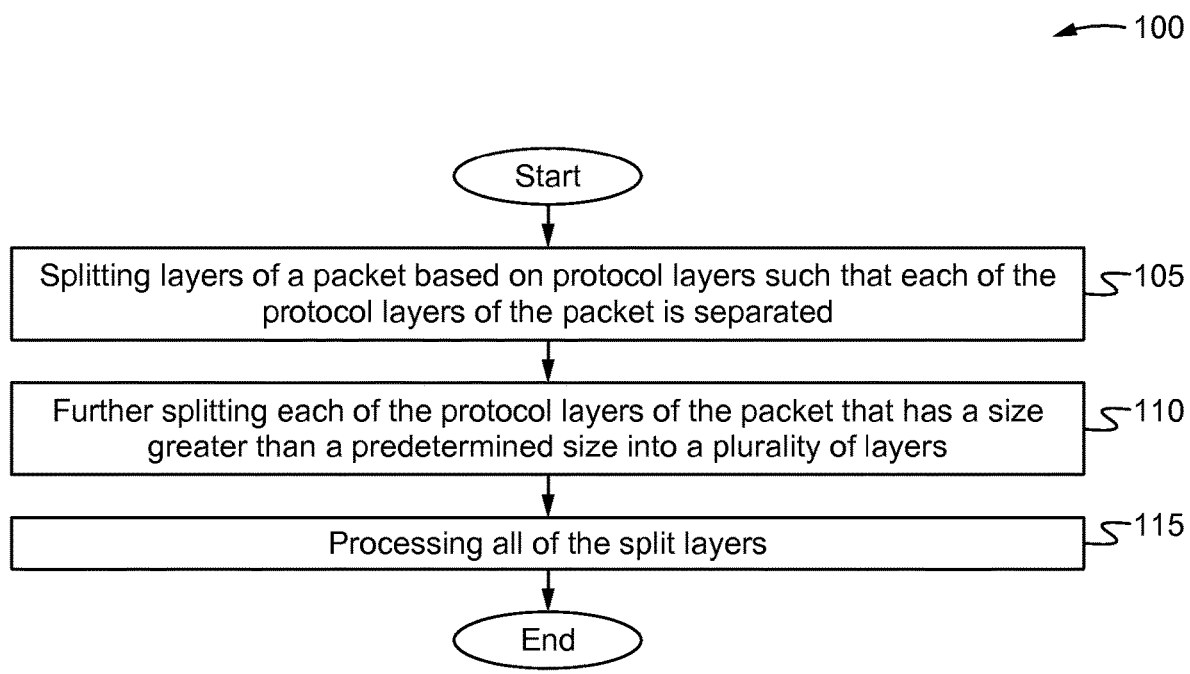
FIG. 1 illustrates a method of a parser engine in accordance with some embodiments of the present invention.

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the apparatus for handling large protocol layers relate to an implementation that optimizes a field selection circuit. This implementation provides software like flexibility to a hardware parser engine in parsing packets. The implementation limits a size of each layer and splits any layer that exceeds that size into smaller layers. The parser engine extracts data from the split layers just as it would from a non-split layer and, then, concatenates the extracted data in a final result.

A network device, such as a network switch, is able to switch/route network traffic. The network switch includes at least one input/incoming port and at least one output/outgoing port for receiving and transmitting packets. In some embodiments, the network switch also includes a parser and a rewriter. The parser can include one or more parser engines to identify contents of network packets, and the rewriter can include one or more rewrite engines to modify packets before they are transmitted out from the network switch. The parser engine(s) and the rewrite engine(s) are flexible and operate on a programmable basis.

The network switch also includes memory to store data used by the network switch. For example, the memory stores at least two arrays used in the implementation to keep track of the split layers. For another example, the memory stores a set of generic commands to extract fields from protocol headers. For yet another example, the memory also stores counters and statistics.

In Ethernet, packets include multiple protocol layers. Each protocol layer carries different information. Some examples of well known layers are:
Ethernet
PBB Ethernet
ARP
IPV4
IPV6
MPLS
FCOE
TCP
UDP
ICMP
IGMP
GRE
ICMPv6
VxLAN
TRILL
CNM Theoretically, the protocol layers can occur in any order. However, only some well-known combinations of these layers occur. Some examples of valid combinations of these layers are:
Ethernet
Ethernet, ARP
Ethernet, CNM
Ethernet, FCoE
Ethernet, IPV4
Ethernet, IPV4, ICMP
Ethernet, IPV4, IGMP For packet parsing operations, a packet is broken into layers. This split is done based on well-known layers such as those listed above. As explained above, in traditional hardware implementations, to extract "T" total bytes in a programmable way from a layer, where the layer can be of size "L" bytes, the total number of byte MUXes required for that layer is T*(L:1) MUXes. Thus, the bigger "L" is, the bigger the size of a field selection circuit, which increases hardware costs.

The current implementation optimizes a field selection circuit of the parser engine. The current implementation relies on an assumption regarding byte processing order. Typically, the order of bytes output by the parser engine matches the order in which the bytes appear in an incoming layer. For example, if byte 1, byte 3 and byte 5 are to be selected, then the order in which the bytes appear is 1, 3 and 5 and is not 3, 1 and 5 or 5, 3 and 1 or any other such combination. Based on this assumption, the total number of MUXes required is no longer T*(L:1) but, rather, is (L:1)+ (L−1:1)+(L−2:1)+(L−3:1)+ . . . +(T:1), assuming T<L.

Since the cost of the hardware is proportional to the length of the layer "L", the current implementation limits the size of "L" that will be supported and splits any layer that exceeds the length "L" into N smaller layers. The information from the N split layers is extracted just as the parser engine would have from a single layer and then concatenated back in a final result. Extracted data can be used to either form a token or a hash input. Exemplary data extraction from packets is discussed in U.S. patent application Ser. No. 14/309,726, entitled "A Method of Extracting Data from Packets and An Apparatus thereof," filed Jun. 19, 2014, and in U.S. patent application Ser. No. 14/309,739, entitled "A Method of Forming a Hash Input from Packet Contents and An Apparatus thereof," filed Jun. 19, 2014, which are hereby incorporated by reference in their entirety.

The current implementation advantageously achieves the same functionality at a reduced hardware cost. The sequence of the current implementation can be summarized as:

(1) Parse an incoming packet and identify a layer type for each layer along with an offset of where each layer ends. This information is stored in two arrays, namely layerType[ ] and layerEndPtr[ ].

(2) At an end of parsing, compare each layerType[ ] with a programmable register(s). The programmable register(s) contains the following fields:

layerType: indicates a layer type for which the corresponding entry matches;

splitLength: indicates an offset at which this layer should be split at; and newLayerType: indicates a layer type value of the new split layer An exemplary pseudo-code for this comparison is shown in Table 1.

TABLE 1

```
for (layer=0; layer < MAX_LAYERS; layer++)
    for (index=0; index < MAX_ENTRIES; index++)
        if ( layerType[layer] == progEntry[index] .layerType ) {
            // change the end position of this layer
            layerEndPtr[layer] = layerEndPtr[layer] −
            progEntry[index] .splitLength;
            // shift the existing layers information down by 1
            for (shift=MAX_LAYERS; shift >= layer+2; shift−−) {
                layerType[shift] = layerType[shift−1];
                layerEndPtr[shift] = layerEndPtr[shift−1];
            }
            // add the new layer
            layerType[index+1] = progEntry[index] .newLayerType;
            layerEndPtr[index+1] = layerEndPtr[index] +
progEntry[index+1].splitLength;
        }
}
```

The parser engine is a highly configurable hardware parser engine that provides software like flexibility in how network traffic is parsed. FIG. 1 illustrates a method 100 of the parser engine in accordance with some embodiments of the present invention. The parser engine is part of the network switch and identifies contents of network packets. At a step 105, layers of a packet are split based on protocol layers such that each of the protocol layers of the packet is separated. A layer type of each protocol layer of the packet is stored in a first array, namely layerType[ ]. An offset of where each protocol layer of the packet ends is stored in a second array, namely layerEndPtr[ ].

At a step 110, each of the protocol layers of the packet that has a size greater than a predetermined size is further split into a plurality of layers. The first array and the second array based on the further split. The predetermined size is software defined.

At a step 115, all of the split layers are processed. In some embodiments, each of the split layers is generalized to a generic format. Contents are selected from each of the generalized split layers. In some embodiments, at least one from a set of generic commands is applied to the generalized split layer to thereby extract a field from the generalized split layer. In some embodiments, each within the set of generic commands is agnostic of specific fields within protocol layers. In some embodiments, results from the processing are concatenated to form a token that is used for further processing of the packet. Alternatively, a bit vector is applied to results from the processing to form an input to a hash function, wherein an output of the hash function is a unique signature that identifies which of equal-cost multi-path routes the packet should take.

Figure 2:
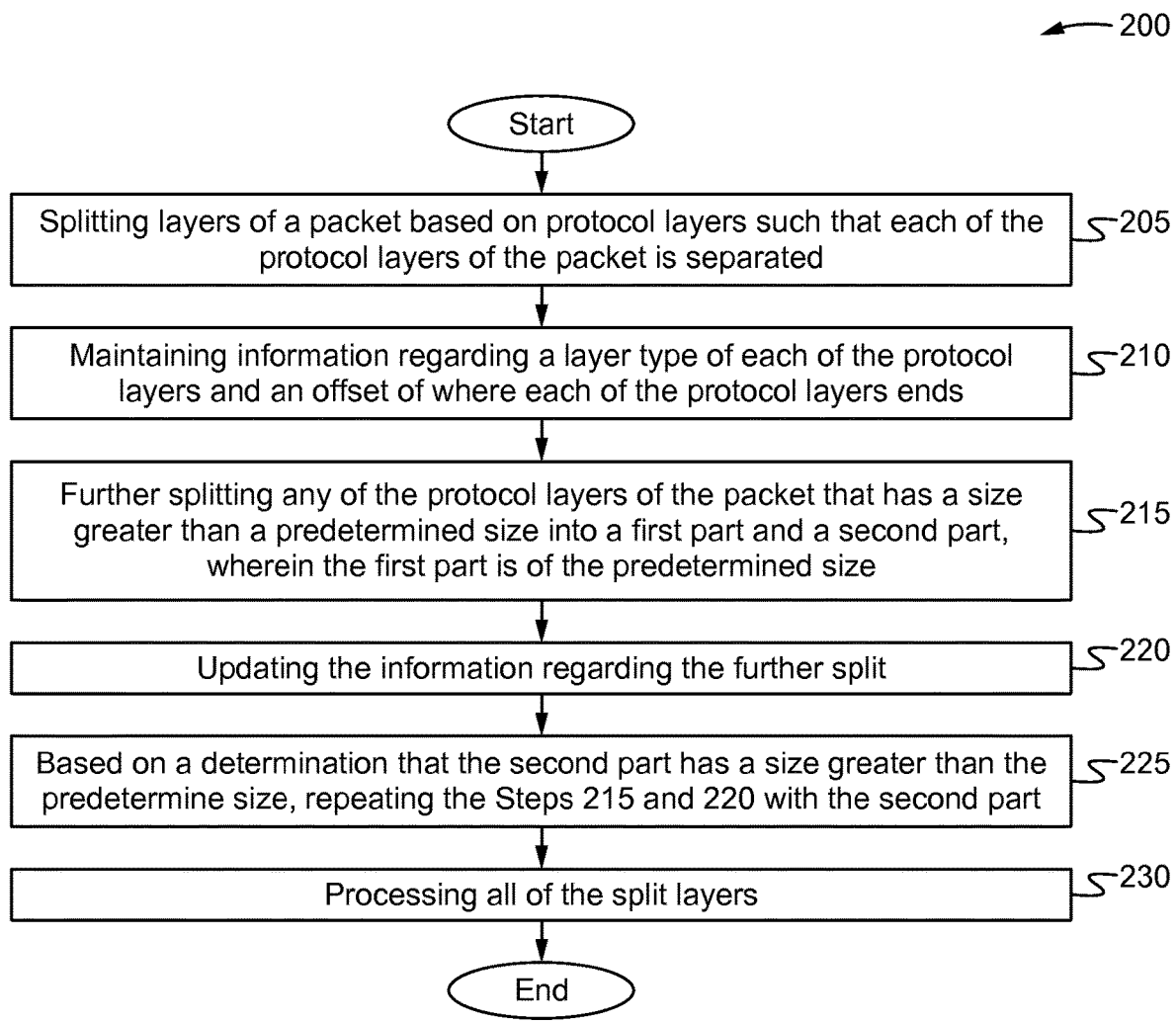
FIG. 2 illustrates another method of a parser engine in accordance with some embodiments of the present invention.

FIG. 2 illustrates another method 200 of the parser engine in accordance with some embodiments of the present invention. At a step 205, layers of a packet are split based on protocol layers such that each of the protocol layers of the packet is separated.

At a step 210, information regarding a layer type of each of the protocol layers and an offset of where each of the protocol layers ends is maintained. The information regarding the layer type is stored in a first array (e.g., layerType[ ]). The information regarding the offsets is stored in a second array (e.g., layerEndPtr[ ]).

At a step 215, any of the protocol layers of the packet that has a size greater than a predetermined size is further split into a first part and a second part, wherein the first part is of the predetermined size. The predetermined size is software defined.

At a step 220, the information is updated based on the further split. Information regarding layer types of the first part and the second part is stored in sequential elements of the first array. Information regarding offsets of the first part and the second part is stored in sequential elements of the second array.

At a step 225, based on a determination that the second part has a size greater than the predetermine size, repeating the steps 215 and 220 with the second part; and At a step 230, all of the split layers are processed. In some embodiments, prior to the step 230, each of the split layers is generalized to a generic format. In some embodiments, processing the split layers includes extracting data from the generalized layers.

Figure 3:
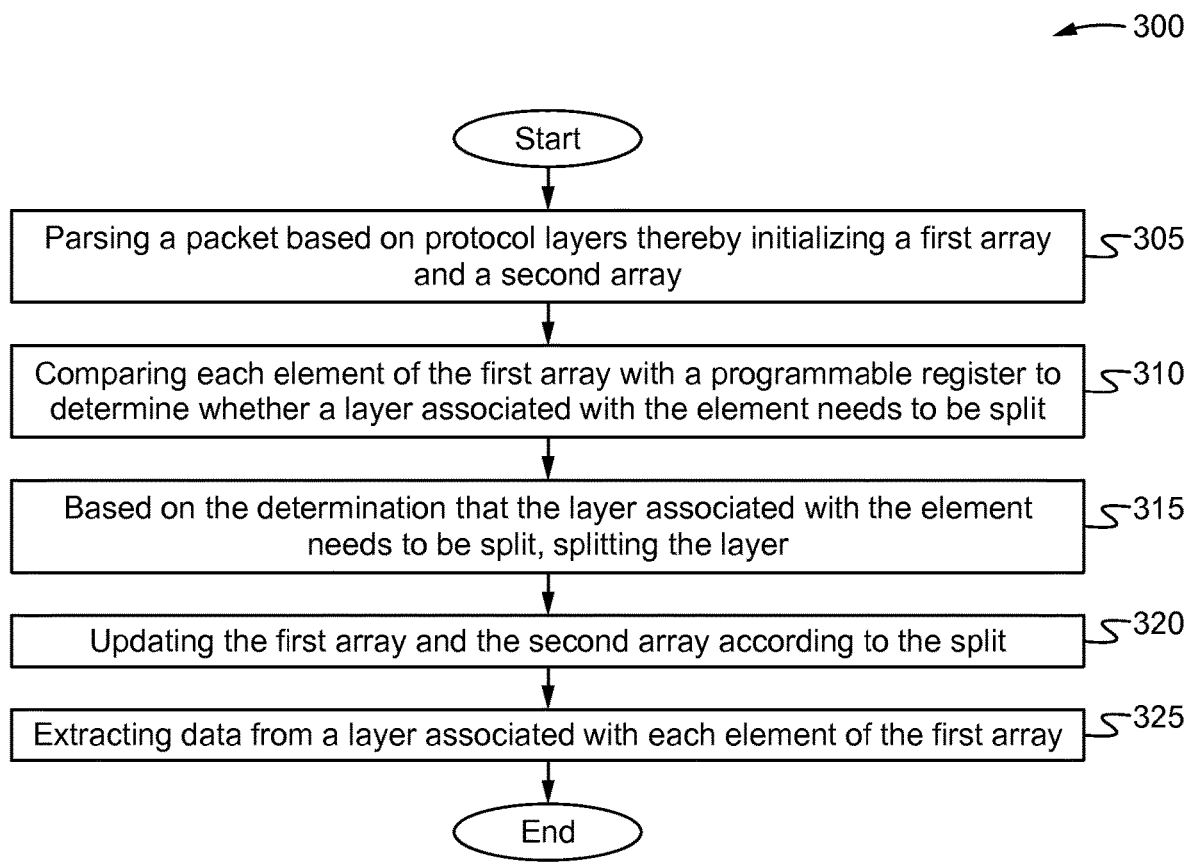
FIG. 3 illustrates a method of a network switch in accordance with some embodiments of the present invention.

FIG. 3 illustrates a method 300 of the network switch in accordance with some embodiments of the present invention. At a step 305, a packet is parsed based on protocol layers. A first array (e.g., layerType[ ]) and a second array (e.g., layerEndPtr[ ]) are initialized according to the parsing. When the packet is parsed, a layer type of each layer in the packet is identified and stored in the first array, and an offset of where each layer ends in the packet is identified and stored in the second array. The first array and the second array are stored in the memory of the network switch.

At a step 310, each element of the first array is compared with a programmable register to determine whether a layer associated with the element needs to be split. The programmable register includes a layerType field, which indicates which a corresponding entry matches, a splitLength field, which indicates an offset at which a corresponding layer should be split at, and a newLayerType field, which indicates a layer type value of the new split layer. Typically, prior to the step 305, the layerType field, the splitLength field and the newLayerType field are programmed via software.

At a step 315, based on the determination that the layer associated with the element needs to be split, the layer is split.

At a step 320, the first array and the second array are updated according to the split.

At a step 325, data from a layer associated with each element of the first array is extracted. In some embodiments, the extracted data is joined to thereby form a final result. Alternatively, a bit vector is applied to results from logical AND operations, wherein each of the logical AND operations is applied on a bit mask and the extracted data from a layer.

The implementation relies on the assumption that the order of bytes output by the parser engine matches the order in which the bytes appear in an incoming layer to advantageously optimize the field selection circuit of the parser engine. Any layer that exceeds a predetermined size is split into smaller layers. The parser engine extracts data from the split layers just as it would from a non-split layer and, then, concatenates the extracted data in a final result.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A method of implementing a parser engine, the method comprising:
    splitting a header of a packet, the header having a plurality of protocol layers, wherein the splitting is based on the protocol layers such that each of the protocol layers of the header is separated with the parser engine;
    further splitting each of the protocol layers of the header that has a size greater than a predetermined size into a plurality of layer subsections with the parser engine;
    processing all of the subsections with the parser engine by extracting data from one or more of the subsections and concatenating the extracted data to form a token, wherein the token is used for further processing of the packet; and
    outputting the packet out of the parser engine after the subsections have been processed.

2. The method of claim 1, wherein splitting layers of a packet includes storing a layer type of each protocol layer of the header in a first array and storing an offset of where each protocol layer of the header ends in a second array.

3. The method of claim 2, wherein further splitting each of the layers of the header includes updating the first array and the second array based on the further split.

4. The method of claim 1, wherein the extracting data from one or more of the subsections includes applying at least one from a set of generic commands to one or more of the subsections to thereby extract a field from the one or more of the subsections.

5. The method of claim 4, wherein each generic command of the set of generic commands is agnostic of specific fields within the protocol layers.

6. The method of claim 1, further comprising applying a bit vector to results from the processing to form an input to a hash function.

7. The method of claim 1, wherein the packet has a body and the splitting of the packet comprises a splitting of the header thereby forming separated parts of the header and the further splitting of the protocol layers comprises the splitting of the separated parts of the header into subparts.

8. The method of claim 1, wherein the further splitting of the protocol layers is independent of whether the protocol layer includes an options field.

9. The method of claim 1, wherein the further splitting of the protocol layers comprises further splitting a TCP protocol layer that does not have an options field-if the size of the TCP protocol layer is greater than the predetermined size.

10. A method of implementing a parser engine, the method comprising:
    splitting a header of a packet, the header having a plurality of protocol layers, wherein the splitting is based on the protocol layers such that each of the protocol layers of the header is separated with the parser engine;
    maintaining information regarding a layer type of each of the protocol layers and an offset of where each of the protocol layers ends;
    further splitting any of the protocol layers of the header that has a size greater than a predetermined size into a first part and a second part, wherein the first part is of the predetermined size;
    updating the information based on the further split;
    based on a determination that the second part has a size greater than the predetermine size, repeating the further splitting step and the updating step with the second part;
    processing all of the split layers by extracting data from one or more of the split layers and concatenating the extracted data to form a token, wherein the token is used for further processing of the packet; and
    outputting the packet out of the parser engine after the split layers have been processed.

11. The method of claim 10, wherein the information regarding the layer type is stored in a first array, and the information regarding the offsets is stored in a second array.

12. The method of claim 11, wherein updating the information includes:
    storing information regarding layer types of the first part and the second part in sequential elements of the first array; and
    storing information regarding offsets of the first part and the second part in sequential elements of the second array.

13. The method of claim 10, further comprising, prior to maintaining information, software defining the predetermined size.

14. The method of claim 10, further comprising, prior to processing, generalizing each of the split layers to a generic format.

15. A method of implementing a network switch, the method comprising:
    parsing a header of a packet, the header having a plurality of protocol layers, wherein the parsing is based on the protocol layers thereby separating each of the protocol layers of the header and initializing a first array and a second array;
    comparing each element of the first array with a programmable register to determine whether one of the protocol layers associated with the element needs to be split;
    based on the determination that the one of the protocol layers associated with the element needs to be split, splitting the one of the protocol layers;

updating the first array and the second array according to the split; and extracting data from the protocol layers associated with each element of the first array;

concatenating the extracted data to form a token, wherein the token is used for further processing of the packet; and outputting the packet out of the network switch after the protocol layers have been processed.

16. The method of claim 15, wherein parsing the packet includes:
  identifying a layer type of each of the protocol layers in the packet;
  storing the layer type of each of the protocol layers in the first array;
  identifying an offset of where each of the protocol layers ends in the packet; and
  storing the offset of where each of the protocol layers ends in the second array.

17. The method of claim 15, wherein the programmable register includes:
  a layerType field, which indicates which a corresponding entry matches;
  a splitLength field, which indicates an offset at which a corresponding protocol layer of the protocol layers should be split; and
  a newLayerType field, which indicates a layer type value of a new split layer.

18. The method of claim 17, further comprising, prior to parsing a packet, programming the layerType field, the splitLength field and the newLayerType field via software.

19. The method of claim 15, further comprising storing the first array and the second array in a memory of the network switch.

20. The method of claim 15, further comprising applying a bit vector to results from logical AND operations, wherein each of the logical AND operations is applied on a bit mask and the extracted data from one of the protocol layers.

21. A network switch comprising:
  an input port and an output port for receiving and transmitting packets each having a header including a plurality of protocol layers;
  a memory for storing a first array and a second array to keep track of the protocol layers; and
  a parser engine for:
    splitting a header of a packet into the protocol layers;
    further splitting any of the protocol layers that exceeds a predetermined size into a plurality of sublayer;
    extracting data from all of the sublayers;
    concatenating the extracted data to form a token, wherein the token is used for further processing of the packet; and
    outputting the packet out of the parser engine after the sublayers have been processed.

22. The network switch of claim 21, wherein the predetermined size is software defined.

23. The network switch of claim 21, wherein the parser engine further:
  applies a logical AND operation on a bit mask and the extracted data for each of the sublayers; and
  applies a bit vector to results from the logical AND operations to form an input of a hash function.

24. The network switch of claim 23, wherein an output of the hash function is a unique signature that identifies which of equal-cost multi-path routes the packet should take.

25. A parser engine comprising a circuit configured to:
  split a header of a packet, the header having a plurality of protocol layers, wherein the splitting is based on the protocol layers such that each of the protocol layers of the header is separated;
  further split each of the protocol layers of the header that has a size greater than a predetermined size into a plurality of sublayers;
  process all of the sublayers by extracting data from one or more of the sublayers and concatenate the extracted data to form a token, wherein the token is used for further processing of the packet; and
  output the packet out of the parser engine after the sublayers have been processed.

26. The parser engine of claim 25, wherein information regarding a layer type of each of the protocol layers and an offset of where each of the protocol layers ends is maintained.

27. The parser engine of claim 26, wherein the information is updated after the further splitting each of the protocol layers of the header that has a size greater than a predetermined size into a plurality of sublayers.

28. The parser engine of claim 25, wherein the circuit is also configured to apply a bit vector to results from the processing to form an input to a hash function.

* * * * *